US009147988B2

(12) United States Patent
Baur et al.

(10) Patent No.: US 9,147,988 B2
(45) Date of Patent: Sep. 29, 2015

(54) DEVICE FOR CONNECTING A LINE ELEMENT TO A COMPONENT

(75) Inventors: Thomas Baur, Weilheim (DE); Boris Stein, Kirchheim (DE); Simon Steinhuebl, Holzmaden (DE)

(73) Assignee: Daimler AG, Stuttgart (DE)

( * ) Notice: Subject to any disclaimer, the term of this patent is extended or adjusted under 35 U.S.C. 154(b) by 237 days.

(21) Appl. No.: 13/809,730

(22) PCT Filed: Jun. 30, 2011

(86) PCT No.: PCT/EP2011/003250
§ 371 (c)(1),
(2), (4) Date: Jan. 11, 2013

(87) PCT Pub. No.: WO2012/007109
PCT Pub. Date: Jan. 19, 2012

(65) Prior Publication Data
US 2013/0130143 A1    May 23, 2013

(30) Foreign Application Priority Data
Jul. 12, 2010  (DE) .................... 10 2010 026 827

(51) Int. Cl.
*H01M 8/04*   (2006.01)
*H01R 43/00*  (2006.01)
*F16L 5/02*   (2006.01)
(Continued)

(52) U.S. Cl.
CPC . *H01R 43/00* (2013.01); *F16L 5/02* (2013.01); *F16L 5/10* (2013.01); *F16L 53/008* (2013.01); *H01M 8/04037* (2013.01);
(Continued)

(58) Field of Classification Search
CPC ............ F16L 53/008; F16L 5/02; F16L 5/10; H01M 8/04037; H01M 8/04201; H01R 43/00; Y02E 60/50
USPC ......................................... 429/433, 434, 436
See application file for complete search history.

(56) References Cited

U.S. PATENT DOCUMENTS 3,612,577 A *  10/1971  Pope et al. ................... 285/14
2005/0067038 A1 *  3/2005  Kobayashi et al. ........... 138/149
(Continued)

FOREIGN PATENT DOCUMENTS

DE    10 2007 009 898 A1    9/2007
EP         0 206 825 A2    12/1986
EP         0 312 204 A2     4/1989

OTHER PUBLICATIONS

International Search Report with English translation dated Aug. 24, 2011 (four (4) pages).
German-language Written Opinion (PCT/ISA/237) (six (6) pages).
English-language translation of Chinese Office Action issued in Chinese Patent Application No. 201180034281.7 dated Mar. 19, 2014 (Three (3) pages).

*Primary Examiner* — Patrick Ryan
*Assistant Examiner* — Ben Lewis
(74) *Attorney, Agent, or Firm* — Crowell & Moring LLP

(57) ABSTRACT

A device for connection of a line element to a component is provided. The line element ends in a connection housing or is connected to such a connection housing. A releasable fixing arrangement is configured between the connection housing and the component. A line section extending in the connection housing is heated by an electric heating wire. The heating wire externally surrounds the line section. The heated line section projects in the direction of the component so far over the region for releasable fixing of the connection housing on the component that it ends in the inner space of the component.

11 Claims, 1 Drawing Sheet

(51) Int. Cl.
*F16L 5/10* (2006.01)
*F16L 53/00* (2006.01)

(52) U.S. Cl.
CPC ........... *H01M 8/04201* (2013.01); *Y02E 60/50* (2013.01); *Y10T 29/532* (2015.01)

(56) References Cited

U.S. PATENT DOCUMENTS

2007/0036528 A1 2/2007 Ferrone
2007/0212037 A1 9/2007 Koenekamp et al.

\* cited by examiner

DEVICE FOR CONNECTING A LINE ELEMENT TO A COMPONENT

BACKGROUND AND SUMMARY OF THE INVENTION

Exemplary embodiments of the present invention relate to a device for connecting a line element to a component and a fuel cell system having at least one component comprising such a line element.

German Patent Document DE 10 2007 009 898 A1 discloses a heating system for a pipe or a tube in a fuel cell system. A heating wire in contact with the pipe or tube in order to prevent water from freezing in the pipe or tube. The heating wire is, for example, wound around the pipe or tube and is fixed thereto via a protective layer. In addition, a thermal insulation can be provided.

The problem with this structure is that the pipe itself can be heated. Heating is thereby difficult in the region of possible connection elements, in particular if the heated line element is attached to an unheated component, for example a fuel cell stack, a reactor, a water separator or similar. Condensation and freezing of liquid water can then arise in this region, as merely the surrounding pipelines can be heated and this region of the connection is not heated.

Exemplary embodiments of the present invention provide a device for connecting a line element to a component that is designed so that the abovementioned disadvantages are avoided and a connection is ensured that avoids the condensation and possible freezing of liquid from the medium conveyed in the line element.

The device according to the invention for connecting a line element to a component is configured so that the line element ends in a connection housing or is fixedly connected to such a connection housing. This connection housing itself then comprises suitable means for releasable fixing to the component. This can be, for example, a conventional screw interacting with a flange. In addition other releasable connection means would be conceivable, for example plug-in connections with mechanical locking, as described in particular by the SAE paper J 2044.

According to the invention a line section extending in the connection housing is heated via an electric heating wire externally surrounding it. The heated line section thereby projects in the direction of the component so far over the region for releasable fixing of the connection housing to the component that the line section ends in the inner space of the component.

The device according to the invention thus allows the media to be transported to also be heated in the region of the component interface or the connection of the line element to a component as well as allowing the thawing of any medium frozen in this region. As the line section projects into the inner space of the component it can additionally be ensured that condensing medium forming in the region of the possibly cool wall of the component and running down the wall does not penetrate into the line element or the line section. The secure and reliable transport of media with the line element to the component can thus be ensured.

According to an exemplary embodiment of the present invention the material of the connection housing surrounds the heated line section and the heating wire over the whole length of the line section. The heating wire can thus be wound around the line section correspondingly from externally so that no reaction of a medium conveyed in the line section with the possibly very hot heating wire can occur. In addition, due to the fact that the material of the connection housing surrounds both the heating wire and the line section, this can be correspondingly protected against damage. The connection housing or the material of the connection housing thus form a protective layer around the line section provided with the heating wire. This is then protected from mechanical damage so that the heating can be securely and reliably guaranteed.

According to a further advantageous embodiment of the device according to the invention the connection housing is formed from an electrically non-conductive material. Such a connection housing composed of an electrically non-conductive material can also provide, additionally or alternatively to the abovementioned mechanical protection of the line element and/or heating wire, an electrical insulation of the heating wire in relation to the environment so that, besides the heating wire and the line section, merely the material of the connection housing is necessary as a third layer. The structure is correspondingly simple and can be cost-effectively realized.

According to an advantageous further development of the device according to the invention the connection housing is formed integrally with the line element. Such a structure can be used, for example, when line elements with a pre-finished length are used in comparatively large numbers. The line element and the connection housing can then be easily formed integrally so that in the region in which the line element goes into the connection housing, no additional interfaces are produced that could be critical in terms of sealing and possibly in relation to the transmission of electrical heat energy from the region of the connection housing into the region of the line element.

According to a particularly favorable embodiment of the device according to the invention, the connection housing is formed as an injection molded part, which surrounds an end of the line element and the line section on the outer periphery. Such a structure as an injection molded part, in particular made of plastic, can be easily used to produce a comparatively stable and cost-effective connection housing if correspondingly high numbers of connection housings are required. Due to the fact that the connection housing or the injection molded material of the connection housing completely surrounds an end of the line element and the line section, a sealed connection can be produced very simply and efficiently through this structure. Additionally, the line section can be embedded together with the heating wires in the injection molded part insofar as this structure is to be used in the above-described variant. A component is then produced with a single work step on an injection molding unit which brings together all the aforementioned variants and advantages.

As already indicated above, according to a further very advantageous embodiment of the device according to the invention, the line element itself can also be designed to be electrically heated. It can thereby be particularly meaningful and advantageous if the electrical heating both of the line element and of the connection housing is designed so that the heating wire extending in the region of the line section is also connected to a heating wire extending in the region of the line element.

According to a very favorable and advantageous development of the present invention, the electrical connections for the heating wire are guided outwards in the region of the connection housing. This facilitates the electrical connection of the heating wire in the region of the connection housing. As the connection housing is releasably connected to a component, it is generally at a fixedly predefined location during the operation of a system equipped with the device and, unlike a line element formed, for example, as a tube, is typically not moved by vibrations and the like. In this region an arrangement of the electrical connection elements can thereby take place comparatively simply, securely and reliably without these being exposed to the risk of damage through constant movements.

As already mentioned above, the present invention is also directed to a fuel cell system having at least one component. This fuel cell system according to the invention then provides that the at least one component is connected by means of a device according to one of the already-described embodiments to a line element. As already known from the above-mentioned prior art, it is particularly critical in fuel cell systems, in which water is produced or required in a highly pure form as product water and for moistening membranes, if these systems are operated at temperatures below freezing point. However, as this is unavoidable in vehicles in many regions of the world, the device designed according to the invention plays a particularly advantageous role in such fuel cell systems.

BRIEF DESCRIPTION OF THE DRAWING FIGURES

Further advantageous embodiments of the device according to the invention follow furthermore from the remaining dependent sub-claims and will become clear by reference to the exemplary embodiments which are explained in greater detail below by reference to the drawings, in which:

DETAILED DESCRIPTION

The device according to the invention will be described below by reference to the two figures in two possible exemplary embodiments. The structure can provide heating for example in fuel cell systems but also in all other systems, in which heated lines are connected via interfaces to components.

Figure 1:
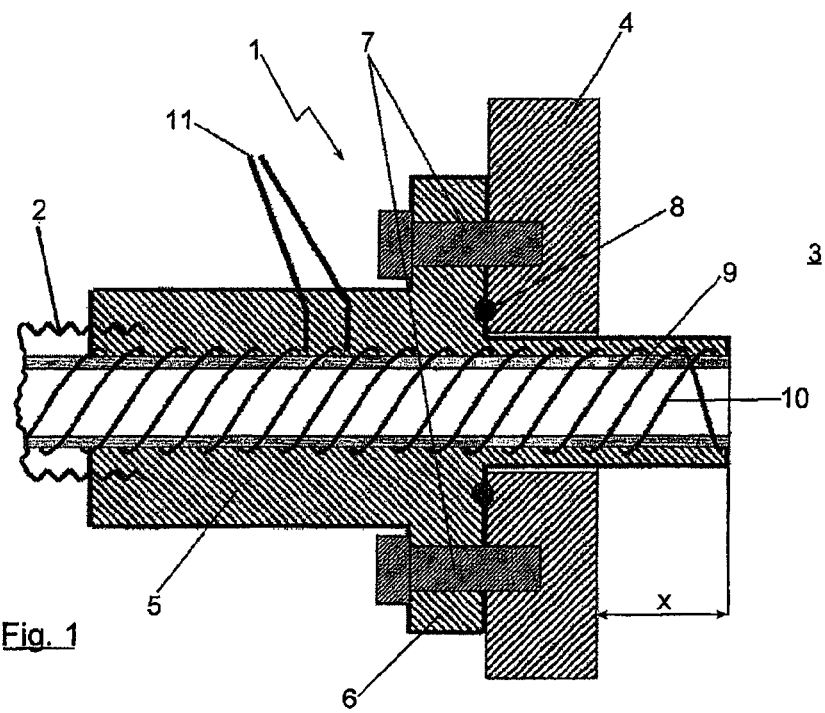
FIG. 1 shows a first embodiment of the device according to the invention.

In the illustration of FIG. 1, a first embodiment of the device 1 according to the invention for connecting a line element 2 to a component 3 can be seen. The line element 2 is thereby shown, for example, as a section of a corrugated tube. Having regard to the component 3, whereby the reference numeral 3 denotes the inside of the component 3 here, merely a wall 4 thereof is explicitly shown in the illustration. The device 1 comprises a connection housing 5. This connection housing 5 comprises a flange 6, which is screwed via two fixing screws 7 to the wall 4 of the component 3. The connection housing 5 is thus releasably connected to the component 3. For sealing, a sealing element 8 in the form of a sealing ring is provided in the region of the flange 6. The connection housing 5 can be composed for example of an injection molded material. In the exemplary embodiment shown here, the line element 2 is thereby integrated into the injection molded material of the connection housing 5 in such a way that the connection housing 5 is connected fixedly and non-releasably to the line element 2. Inside the line element 2, there is a line section 9 which constitutes the continuation of the line element 2 within the connection housing 5 and in which the transported media can flow. The line section 9 can also be designed integrally with the line element 2, thus forming one of its ends. The line section 9 is thereby surrounded by a heating wire 10 which serves to heat at least the line section 9. In the exemplary embodiment shown, the heating wire 9 is thereby electrically contacted by means of two indicated electrical connection elements 11. These electrical connection elements 11 can thereby be easily and simply contacted in the region of the connection housing 5 typically remaining in a fixed location. In the region of the line element 2, which can be designed as both a rigid and also as a flexible line element, the heating can then be correspondingly continued, for example in a manner as is known and usual from the prior art. In order to prevent the electrical connections—in particular if the line element 2 is formed as a tube—being exposed to constant movements, a heating wire (not shown here) can be connected in the region of the line element 2 to the heating wire 10 in the region of the line section 9, so that the whole line element 2 can be supplied via the electrical connection elements 11 with electrical power for heating.

The injection molded material of the connection housing 5 thereby surrounds, as can be seen in the illustration of FIG. 1, the line section 9 together with the heating wire 10 wound around the outer periphery of the line section 9 and thus insulates the structure outwardly. If the line section 9 itself is also formed from an electrically non-conductive material, the heating wire 10 can be used—without further insulation measures or similar being necessary—as the heating wire 10 is then held securely and reliably in its position between the line section 9 and the material of the connection housing 5 with electrical insulation and mechanical protection.

It can also be seen in the illustration of FIG. 1 that the line section 9 projects in the direction of the inner space of the component 3 so far beyond the actual connection housing 5 or the flange 6 that it projects through the wall 4 of the component 3 and projects by a certain portion, denoted in FIG. 1 by X, into the inside of the component 3. Through this particular structure of the connection housing 5 to the electrically heated line element 9, not only the region of the line is electrically heated but also in particular the comparatively critical region at the connecting point between the line element 2 and a component 3. Due to the fact that the line section 9 projects inside the component 3, the heating takes place securely and reliably until the medium conveyed via the line element 2 and the line section 9 has reached the inside of the component 3. The line section 9 projecting inwardly by the amount X can also ensure that any condensing liquid on the inner side of the wall 4 of the component 3 does not penetrate into the line section 9 when it runs down the wall 4 but instead flows around the line section 9 in the region of the inner face of the wall 4. A secure and reliable functionality is thus ensured. Due to the comparatively simple structure, which can be provided, for example, as an injection molded part on pre-manufactured and in particular heatable line elements 2, it can be ensured with a correspondingly high production number of connection housings 5 and a suitable injection molding tool that a high functionality of the structure can be achieved simply, securely and reliably with very low costs.

Figure 2:
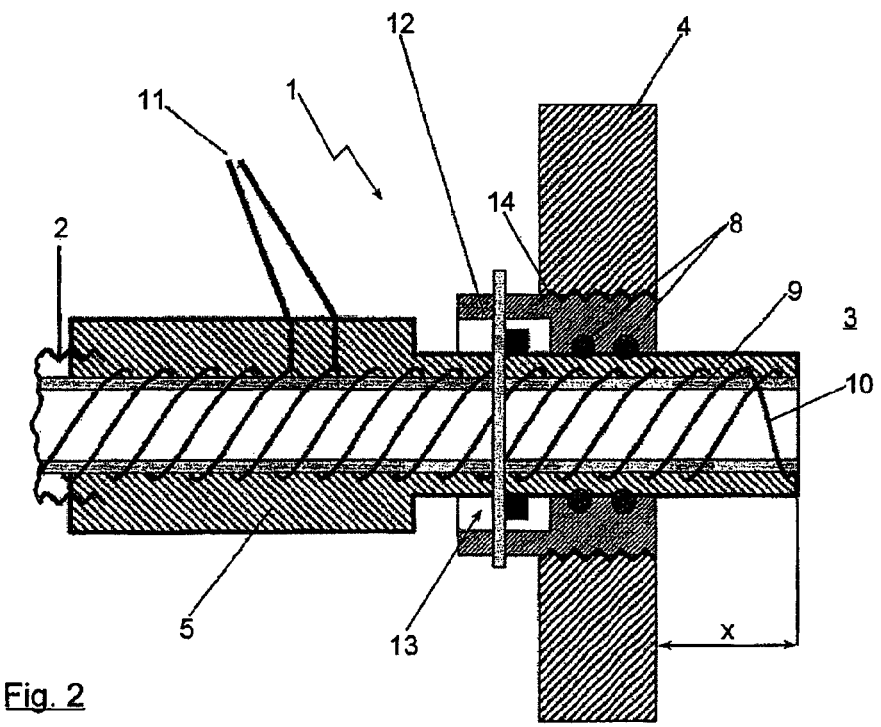
FIG. 2 shows a second embodiment of the device according to the invention.

According to the illustration of FIG. 2, an alternative embodiment of the device 1 according to the invention 1 can be seen. The structure is thereby designed so that the functionality is essentially the same. The components provided with the same reference numerals thereby correspond to the components described within the scope of FIG. 1. The difference between the two embodiments according to FIGS. 1 and 2 lies in the manner of fixing of the connection housing 5 in the region of the component 3 or its wall 4. Instead of the above-described fixing screws 7, which interact with the flange 6, a receiving element 12 is provided here in the region of the wall 4. In the region of this receiving element 12, the line section 9 together with the surrounding material of the connection housing 5 is sealed via two radial sealing elements 8 in the form of a double ring seal. The connection housing 5 is then held via a mechanical locking element 13 in the region of the receiving element 12 in such a way that this can be inserted and fixed through the mechanical locking element 13. This can be designed for example on the basis of SAE J 2044. The receiving element 12 can thereby be incorporated for example through a thread 14, as indicated in the illustration of FIG. 2, in the region of the wall 4 of the component 3. Alternative embodiments with a receiving element 12 welded into the wall 4 or with a receiving element 12 stuck to the wall 4 of the component 3 would also obviously be conceivable.

Otherwise, the structure of the device 1, as can be seen in the illustration of FIG. 2, is essentially the same since—in this case too—in the region of the connection housing 5 the line section 9 is surrounded as a heated line section by the heating wire 10 and can heat or thaw a media flow through the line element 2 and the line section 9 into the inside of the component 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device for connecting a line element to a component, the device comprising:
   a connection housing, wherein the line element terminates in the connection housing or the line element is permanently connected to the connection housing; and
   a connection element arranged to releasably fix the connection housing and the component,
   wherein a heated line section of the line element extending in the connection housing is externally surrounded by an electrical heating wire configured to heat the line section,
   wherein the heated line section that is externally surrounded by the electrical heating wire projects in a direction of the component so far over a region in which the connection element is releasably fixed to the connection housing that the heated line section that is externally surrounded by the electrical heating wire terminates in an inner space of the component.

2. The device according to claim 1, wherein a material of the connection housing surrounds the heated line section and the heating wire over a whole length of the line section.

3. The device according to claim 1, wherein the connection housing is comprised of an electrically non-conductive material.

4. The device according to claim 1, wherein the connection housing is integrally formed with the line element.

5. The device according to claim 1, wherein the connection housing is an injection moulded component that surrounds the end of the line element and the line section on an outer periphery.

6. The device according to claim 1, further comprising:
   sealing elements arranged between the connection housing and the component.

7. The device according to claim 1, wherein the connection housing is fixed via a flange to a housing of the component.

8. The device according to claim 7, wherein
   the connection housing is positioned in a region of the housing of the component, or
   a receiving element is connected to the housing of the component and held via a mechanical locking element.

9. The device according to claim 1, wherein the line element is configured to be electrically heated by the heating wire.

10. The device according to claim 9, wherein electrical connection elements for the heating wire are outwardly guided in a region of the connection housing.

11. A fuel cell system, comprising:
    a line element;
    a component; and
    a device configured to connect the line element to the component, the device comprising:
       a connection housing, wherein the line element terminates in the connection housing or the line element is permanently connected to the connection housing; and
       a connection element arranged to releasably fix the connection housing and the component,
    wherein a heated line section of the line element extending in the connection housing is externally surrounded by an electrical heating wire configured to heat the line section,
    wherein the heated line section that is externally surrounded by the electrical heating wire projects in a direction of the component so far over a region in which the connection element is releasably fixed to the connection housing that the heated line section that is externally surrounded by the electrical heating wire terminates in an inner space of the component.

* * * * *